July 4, 1933.  B. G. HOWELL ET AL  1,916,479
PIPE COUPLING
Filed June 28, 1932
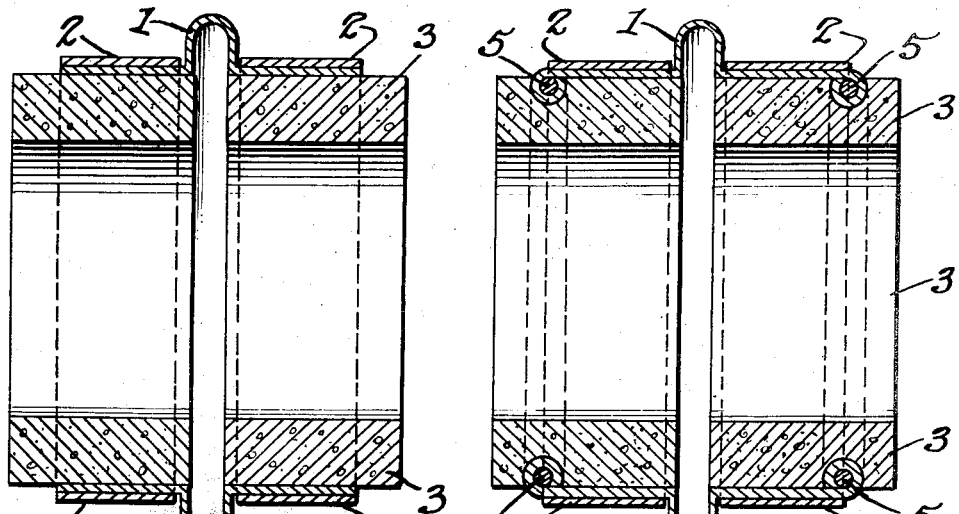
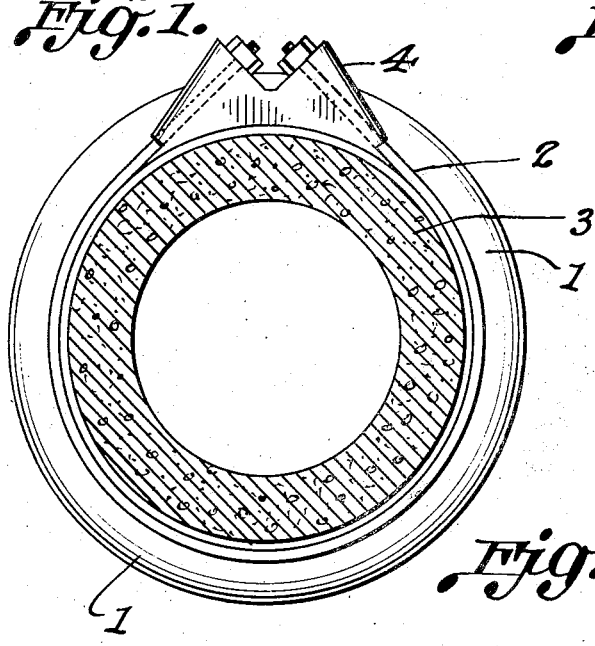
INVENTOR
Bruce Gordon Howell
Ira Franklin Stone Patented July 4, 1933

1,916,479

UNITED STATES PATENT OFFICE

BRUCE GORDON HOWELL, OF HARLINGEN, TEXAS, AND IRA F. STONE, OF ARLINGTON, VIRGINIA

PIPE COUPLING

Application filed June 28, 1932. Serial No. 619,800.

This invention relates to flexible pipe couplings which are adapted to connect adjacent sections of pipe in a fluid tight construction which at the same time allows for expansion and contraction of the pipe or conduit, which may be occasioned by temperature changes, and any other relative movement of the adjacent pipe ends due to slight misalignment thereof.

Prior to this invention numerous forms of such joints have been proposed and the chief objection to them has been that they are so complicated as to be prohibitive for extensive use or else unsatisfactory in providing a permanently fluid tight construction.

One object of this invention is to provide a flexible pipe joint which overcomes the objections stated by its simplicity and ruggedness of construction.

Another object is to provide a fluid-tight expansion-permitting joint which is capable of having concrete pipe cast into it.

Yet another object is to form a flexible coupling especially suited for use with precast concrete conduits.

A still further object is to provide a yieldable rust resisting metallic pipe joint which will be fluid-tight under internal pressures.

Other objects and advantages will appear to those skilled in the art from the following description in which:

Fig. 1 is a longitudinal horizontal section through the preferred form of joint, Fig. 2 is a vertical transverse section of the pipe showing the joint in elevation, and Fig. 3 is a section similar to Fig. 1 of a modification.

Referring more particularly to the drawing wherein like reference characters refer to like parts, the portions of the main pipe ends are shown at 3. In Fig. 1, where the the pipes may be of precast concrete or other commonly known pipe material, the joint is constructed in the following manner. A sleeve 1 and the bands 2 are first placed on one of the pipe ends, the other pipe is then brought into close proximity therewith, allowing sufficient clearance for normal longitudinal expansion, approximately a quarter of an inch. The sleeve and clamping bands are then drawn over the adjacent pipe to close the gap. It may be desirable to put the clamps on after assembling the pipes and sleeve, this depends on the type of clamp used. To permit the desired flexibility the sleeve 1 is provided with a rib or corrugation which is formed intermediate the ends of the sleeve to substantially coextend with the clearance provided between the pipe ends, described above. In order that the corrugation or ribbed portion will properly allow expansion, the sleeve is preferably made of some fairly soft yieldable or malleable metal such as lead. Lead is also desirable from the standpoint of its well known rust resisting character, but is understood that other materials having similar or desired characteristics are within the contemplation of this invention.

We have discovered that in order to form a joint of the character described which will satisfactorily and more permanently withstand internal high pressure without leakage, it is desirable to apply a filler to the sleeve engaging portion of the precast pipe before clamping the sleeve in place. The binder or filler may preferably consist of a "rich mixture" of sand, cement and water. Other fillers may be used effectively, however, without departing from the spirit of the present invention. After the filler is applied, the sleeve and clamps are properly placed in the manner previously described. The clamps are drawn tight and when the filler hardens a very effective and simple expansion joint is formed.

In Fig. 3 a modification is shown which is more effective for use where the conduit is to be cast into the sleeve. The sleeve 2 may be ribbed and rolled to the proper size and shape, the ends are then rolled about the wire bands 5 to form a flange or bead. With the band 2 in place the sleeve is placed in a form and the concrete conduit is cast therein. When the concrete has hardened and the form is removed the band is properly tensioned and thus a permanently fluid-tight flexible connection is formed.

It is seen that we have provided a novel but yet simple, cheap, rugged and effective fluid-tight flexible pipe coupling.

We have described structural embodiments of our invention by way of example only and intend only to be limited in the scope of our invention by the claims hereto appended.

What we claim is:

1. Means for joining the abutting ends of pipe sections at the time they are being molded to provide for expansion and contraction due to temperature changes comprising a flexible metallic sleeve having an expansion zone adapted to be disposed about the pipe ends, and reinforced beads at the ends of the sleeve anchored in the outer surfaces of the pipe sections at the time they are being cast.

2. Means for joining the abutting ends of pipe sections at the time they are being molded so as to provide for expansion and contraction due to temperature changes comprising a flexible metallic sleeve having an expansion zone adapted to be anchored in the pipe ends at the time they are molded, flexible bands disposed about the ends of the sleeve beyond the expansion zone, and means to contract said bands about said sleeve ends.

In testimony whereof I affix my signature.

BRUCE GORDON HOWELL.

In testimony whereof I affix my signature.

IRA F. STONE.